US012587058B2

(12) United States Patent
Iijima et al.

(10) Patent No.: US 12,587,058 B2
(45) Date of Patent: Mar. 24, 2026

(54) ROTARY MACHINE WITH REFRIGERANT FLOW PATH

(71) Applicant: IHI Corporation, Tokyo (JP)

(72) Inventors: Kai Iijima, Tokyo (JP); Yuji Sasaki, Tokyo (JP); Hikaru Sugiura, Tokyo (JP)

(*) Notice: Subject to any disclaimer, the term of this patent is extended or adjusted under 35 U.S.C. 154(b) by 237 days.

(21) Appl. No.: 18/069,234

(22) Filed: Dec. 21, 2022

(65) Prior Publication Data

US 2023/0125199 A1 Apr. 27, 2023

Related U.S. Application Data

(63) Continuation of application No. PCT/JP2021/032706, filed on Sep. 6, 2021.

(30) Foreign Application Priority Data

Sep. 18, 2020 (JP) ................................. 2020-157788

(51) Int. Cl.
| | |
|---|---|
| *H02K 5/20* | (2006.01) |
| *F04D 13/06* | (2006.01) |
| *F04D 29/18* | (2006.01) |
| *F04D 29/40* | (2006.01) |
| *H02K 9/19* | (2006.01) |

(52) U.S. Cl.
CPC ............. *H02K 5/203* (2021.01); *F04D 13/06* (2013.01); *F04D 29/18* (2013.01); *F04D 29/406* (2013.01); *H02K 9/19* (2013.01)

(58) Field of Classification Search
USPC ...................................................... 417/423.8
See application file for complete search history.

(56) References Cited

U.S. PATENT DOCUMENTS

| | | | | |
|---|---|---|---|---|
| 3,127,530 A | * | 3/1964 | White .................... | H02K 5/203 |
| | | | | 165/46 |
| 4,516,044 A | * | 5/1985 | Bone ...................... | H02K 5/203 |
| | | | | 165/169 |
| 4,700,092 A | | 10/1987 | Bincoletto | |

(Continued)

FOREIGN PATENT DOCUMENTS

| | | | | |
|---|---|---|---|---|
| CN | 102150347 A | * | 8/2011 | ............. F16J 15/064 |
| CN | 204465230 | | 7/2015 | |

(Continued)

OTHER PUBLICATIONS

Machine Translation CN-102150347 Knight (Year: 2024).*

(Continued)

*Primary Examiner* — Bryan M Lettman
*Assistant Examiner* — Geoffrey S Lee
(74) *Attorney, Agent, or Firm* — SHIPWAY IP

(57) ABSTRACT

A rotary machine includes an electric motor including a rotor and a stator, a rotating shaft to be rotated driving the electric motor, an impeller attached to the rotating shaft, an inner case surrounding the stator and to which the stator is fixed, and an outer portion externally mounted on the inner case. The outer portion includes an inner circumferential surface facing an outer circumferential surface of the inner case, and a flow path groove formed on the inner circumferential surface and through which a refrigerant passes.

14 Claims, 6 Drawing Sheets

(56)          References Cited

U.S. PATENT DOCUMENTS

| | | | | |
|---|---|---|---|---|
| 4,890,988 | A | * | 1/1990 | Kramer ............... H02K 49/106 |
| | | | | 417/372 |
| 5,744,880 | A | | 4/1998 | Kudoh et al. |
| 10,516,316 | B2 | * | 12/2019 | Carrillo ................... H02K 5/18 |
| 11,788,552 | B2 | * | 10/2023 | Iizuka .................. F04D 29/628 |
| | | | | 418/83 |
| 2003/0222519 | A1 | * | 12/2003 | Bostwick ............... H02K 5/203 |
| | | | | 310/58 |
| 2004/0179947 | A1 | * | 9/2004 | Agrawal ............ F04D 25/0606 |
| | | | | 417/254 |
| 2009/0127946 | A1 | * | 5/2009 | Fee ........................ H02K 5/203 |
| | | | | 310/64 |
| 2013/0259720 | A1 | * | 10/2013 | Mills ...................... H02K 5/203 |
| | | | | 417/410.1 |
| 2014/0125163 | A1 | | 5/2014 | Yu |
| 2015/0048700 | A1 | | 2/2015 | Liu et al. |
| 2015/0308456 | A1 | * | 10/2015 | Thompson ............. F04D 17/12 |
| | | | | 417/244 |
| 2018/0278119 | A1 | | 9/2018 | Carrillo et al. |
| 2019/0345956 | A1 | | 11/2019 | Iizuka et al. |
| 2020/0220421 | A1 | | 7/2020 | Yoshioka et al. |

FOREIGN PATENT DOCUMENTS

| | | | | | |
|---|---|---|---|---|---|
| CN | 105264752 | A | * | 1/2016 | ............... H02K 5/20 |
| CN | 105264752 | B | * | 1/2018 | ............... H02K 5/20 |
| CN | 108141098 | | | 6/2018 | |
| CN | 208046365 | U | * | 11/2018 | ............ H02K 15/14 |
| CN | 109563846 | | | 4/2019 | |
| CN | 110620470 | A | * | 12/2019 | ............... H02K 5/18 |
| CN | 111200341 | A | * | 5/2020 | ............... H02K 5/20 |
| CN | 111416463 | | | 7/2020 | |
| CN | 114128087 | A | * | 3/2022 | ............... H02K 1/20 |
| CN | 117458770 | A | * | 1/2024 | |
| JP | S59-070162 | | | 4/1984 | |
| JP | S62-012350 | | | 1/1987 | |
| JP | H2-088445 | | | 7/1990 | |
| JP | H9-009561 | | | 1/1997 | |
| JP | H9-014266 | | | 1/1997 | |
| JP | H10-210702 | | | 8/1998 | |
| JP | 2000270518 | A | * | 9/2000 | ............... H02K 5/20 |
| JP | 2006-033916 | | | 2/2006 | |
| JP | 2011072183 | A | * | 4/2011 | ............... H02K 5/20 |
| JP | 2014-096979 | | | 5/2014 | |
| JP | 2015-535677 | | | 12/2015 | |
| JP | 2017-099281 | | | 6/2017 | |
| JP | 2018-157644 | | | 10/2018 | |
| KR | 20110136055 | A | * | 12/2011 | |
| WO | WO-2005078900 | A1 | * | 8/2005 | ............... H02K 5/20 |
| WO | 2014/089978 | | | 6/2014 | |
| WO | WO-2015166772 | A1 | * | 11/2015 | ............... H02K 5/20 |
| WO | 2017/054954 | | | 4/2017 | |
| WO | 2018/139497 | | | 8/2018 | |
| WO | WO-2023214190 | A1 | * | 11/2023 | ............... H02K 1/32 |

OTHER PUBLICATIONS

Machine Translation CN-102150347 Knight (Obtained from USPTO Search) (Year: 2024).*
Machine Translation of CN105264752 (Year: 2024).*
Machine Translation of CN117458770 (Year: 2024).*
Machine Translation of CN208046365 (Year: 2024).*
Machine Translation of KR20110136055 (Year: 2024).*
Machine Translation of CN10620470 (Year: 2024).*
Machine Translation of CN111200341 (Year: 2024).*
Machine Translation of CN114128087 (Year: 2024).*
Machine Translation of JP2000270518 (Year: 2024).*
Machine Translation of JP2011072183 (Year: 2024).*
International Preliminary Report on Patentability with Written Opinion dated Mar. 30, 2023 for PCT/JP2021/032706.
International Search Report dated Nov. 16, 2021 for PCT/JP2021/032706.

\* cited by examiner

ROTARY MACHINE WITH REFRIGERANT FLOW PATH

CROSS-REFERENCE TO RELATED APPLICATIONS

This application is a continuation application of PCT Application No. PCT/JP2021/032706, filed on Sep. 6, 2021, which claims the benefit of priority from Japanese Patent Application No. 2020-157788, filed on Sep. 18, 2020. The entire contents of the above listed PCT and priority applications are incorporated herein by reference.

BACKGROUND

Field

The present disclosure relates to a rotary machine.

Description of the Related Art

Cooling structures for electric motors are described in Japanese Unexamined Patent Publication No. 2006-033916, Japanese Unexamined Patent Publication No. 2017-99281, Japanese Unexamined Patent Publication No. S59-070162, and Japanese Unexamined Patent Publication No. H10-210702. Also, there is a rotary machine such as a turbocharger including an impeller. This type of rotary machine includes an electric motor that rotates an impeller mainly or auxiliarily. A cooling channel is provided near the electric motor, and heat generation of the electric motor is inhibited by a refrigerant passing through the cooling channel.

SUMMARY

Disclosed herein is an example rotary machine. The rotary machine includes: an electric motor including a rotor and a stator; a rotating shaft configured to rotate through driving of the electric motor; an impeller attached to the rotating shaft; an inner case surrounding the stator and to which the stator is fixed; and an outer portion externally mounted on the inner case. In the rotary machine, the outer portion includes an inner circumferential surface facing an outer circumferential surface of the inner case, and a flow path groove formed on the inner circumferential surface and through which a refrigerant passes.

Another example rotary machine includes: an electric motor including a rotor and a stator; a rotating shaft configured to rotate through driving of the electric motor; an impeller attached to the rotating shaft; an inner case surrounding the stator and to which the stator is fixed; and an outer portion externally mounted on the inner case. In the rotary machine, the inner case includes both end portions of the rotating shaft in an axial direction thereof, and the outer portion includes a back wall facing one of both end portions of the inner case, and a back groove provided on the back wall and through which a refrigerant passes.

DETAILED DESCRIPTION

Figure 1:
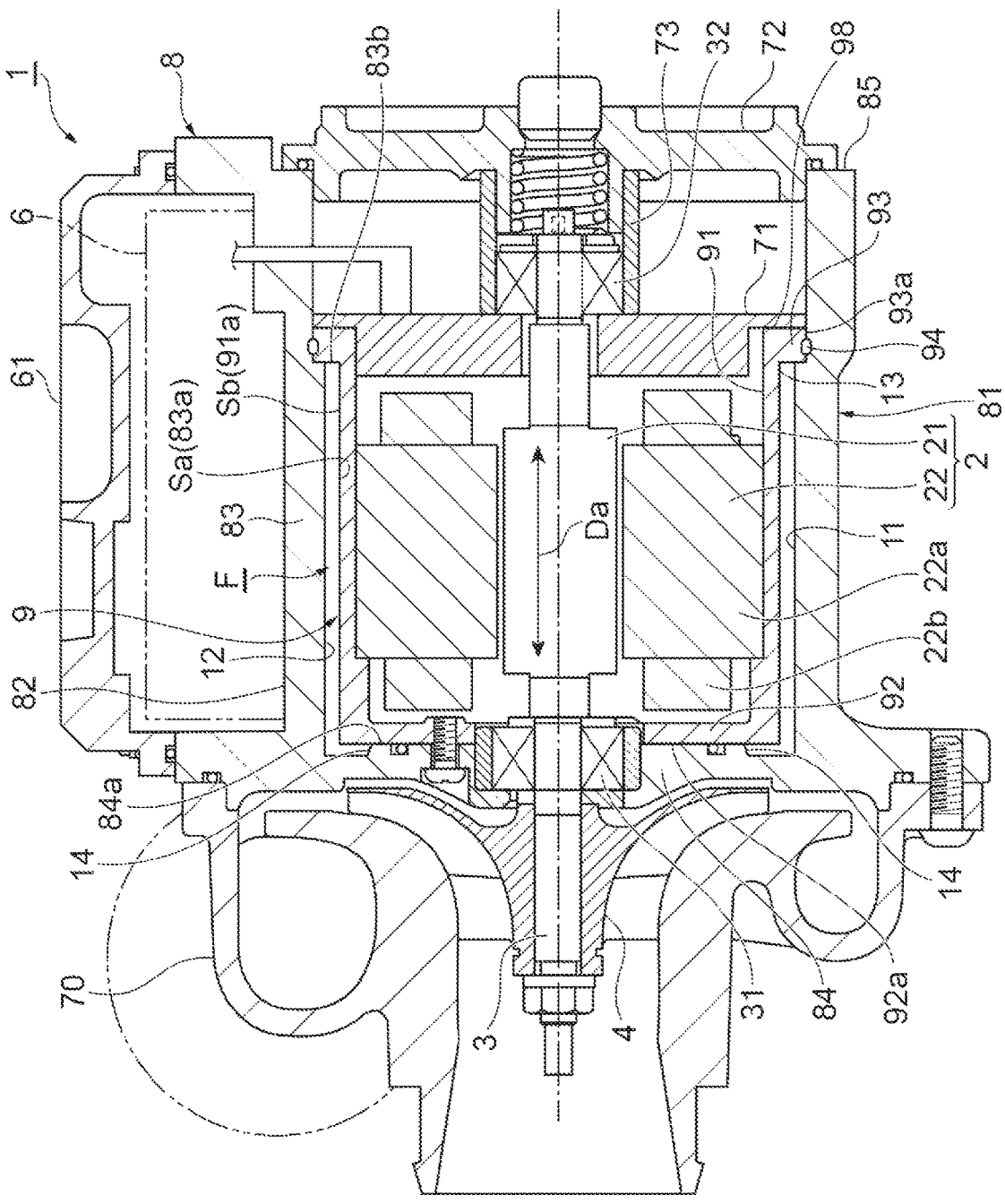
FIG. 1 is a cross-sectional view illustrating an example rotary machine.

In the following description, with reference to the drawings, the same reference numbers are assigned to the same components or to similar components having the same function, and overlapping description is omitted.

An example of the present disclosure is a rotary machine including an electric motor including a rotor and a stator, a rotating shaft configured to rotate through driving of the electric motor, an impeller attached to the rotating shaft, an inner case surrounding the stator and to which the stator is fixed, and an outer portion externally mounted on the inner case. In the rotary machine, the outer portion includes an inner circumferential surface facing an outer circumferential surface of the inner case, and a flow path groove formed on the inner circumferential surface and through which a refrigerant passes.

In one example, the stator of the electric motor is fixed to the inner case, and the outer portion is externally mounted on the inner case. The flow path groove through which the refrigerant passes is formed in the inner circumferential surface of the outer portion, and the flow path groove is disposed around the inner case. The stator of the electric motor is cooled via the inner case by the refrigerant passing through the flow path groove. As a result, the electric motor can be cooled. Here, the flow path groove is mainly formed in the outer portion. That is, with respect to the inner case on the inner side, there are few restrictions on dimensions, structures, and the like for forming the flow path groove. Accordingly, for example, it may devise a technique such as thinning a thickness of the inner case to uniformly cool the stator over a wide range.

In one example, the inner case may include both end portions of the rotating shaft in an axial direction thereof, and the outer portion may include a side wall including the inner circumferential surface, a back wall facing one of both end portions of the inner case, and a return groove provided on the back wall and communicating with the flow path groove. Since the return groove through which the refrigerant passes is formed in the back wall, one end portion of the stator fixed to the inner case can be cooled.

In one example, the flow path groove may include a plurality of main grooves extending in the axial direction, and the plurality of main grooves may be arranged side by side in a circumferential direction of the inner case and communicate with each other via the return groove. Since the plurality of main grooves are arranged side by side in the circumferential direction of the inner case and communicate with each other via the return groove, the stator can be cooled from a wide range in the circumferential direction of the inner case.

In one example, the side wall may include a stepped portion that is provided on a side opposite to the back wall in the axial direction and has an enlarged inner diameter, the flow path groove may include a connection groove that causes the plurality of main grooves to communicate with each other and is opened at the stepped portion, and the inner case may include a flange portion that abuts the stepped portion to seal the connection groove. Since the plurality of main grooves communicate with each other via the connection grooves, a wide range can be cooled using a common refrigerant.

In one example, the flow path groove may include an inlet configured to receive the refrigerant and an outlet configured to discharge the refrigerant, and the flow path groove and the return groove may form a one-pass channel connecting the inlet to the outlet. By forming the one-pass channel, it may reduce the number of locations in which the refrigerant stays, and it becomes easier to form a smooth flow of the refrigerant.

In one example, a flow path cross-section of the return groove may be smaller than the maximum flow path cross-section of the flow path groove. A flow velocity in the return groove becomes relatively faster than that in the flow path groove, which may improve cooling efficiency on the back wall.

In one example, the back wall may be disposed between the impeller and the stator, and at least a portion of the return groove may be disposed to overlap the impeller in the axial direction. Both of the stator and the impeller can be cooled by the refrigerant passing through the return groove.

In one example, the inner case may include the outer circumferential surface that comes into contact with the inner circumferential surface of the outer portion, and at least a region of the outer circumferential surface facing the flow path groove of the inner case may be flat. When the region of the inner case facing the flow path groove is flat, the flow path groove serving as a flow path for the refrigerant can be sealed (airtightly or liquid-tightly) when the flow path groove is closed.

In one example, the flow path groove may include the connection groove that causes the plurality of main grooves to communicate with each other, one end portion of the main groove may be connected to the return groove, and the other end portion thereof may be connected to the connection groove.

In one example, a plurality of the connection grooves may be provided to be arranged in the circumferential direction, a plurality of the return grooves may be provided to be arranged in the circumferential direction, and the connection grooves and the return grooves may be alternately disposed in the circumferential direction.

An example rotary machine including an electric motor including a rotor and a stator, a rotating shaft configured to rotate through driving of the electric motor, an impeller attached to the rotating shaft, an inner case surrounding the stator and to which the stator is fixed, and an outer portion externally mounted on the inner case. In the rotary machine, the inner case includes both axial end portions of the rotating shaft, and the outer portion includes a back wall facing one of both end portions of the inner case and a back groove provided on the back wall and through which a refrigerant passes.

Figure 2:
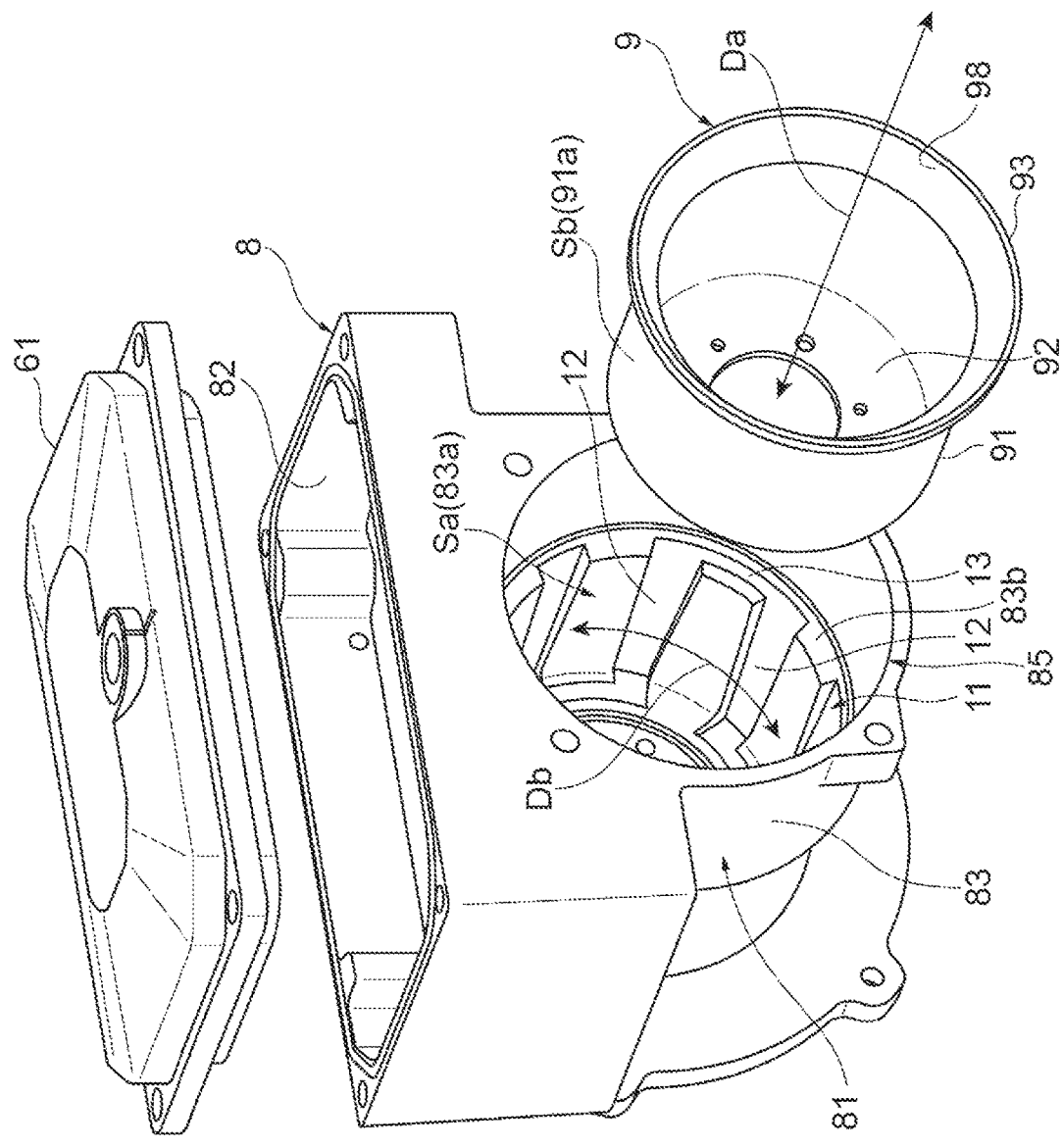
FIG. 2 is an exploded perspective view illustrating a part of the rotary machine.

FIGS. 1 and 2 illustrate an example rotary machine 1 is an electric supercharger. The rotary machine 1 includes an electric motor 2, a rotating shaft 3 rotated by driving the electric motor 2, and a compressor impeller 4 attached to the rotating shaft 3. The rotary machine 1 also includes an inverter 6 that controls driving of the electric motor 2.

The electric motor 2 includes a rotor 21 fixed to the rotating shaft 3 and a stator 22 disposed to surround the rotor 21. The stator 22 includes teeth 22a and coils 22b wound around the teeth 22a. A stator case 9 (e.g., inner case) is disposed to surround the electric motor 2, and particularly to surround the stator 22. The stator 22 is fixed inside the stator case 9.

The stator case 9 has a cylindrical shape with a bottom and includes a cylindrical circumferential wall 91 to which the stator 22 is fixed. The circumferential wall 91 is disposed along an axial direction Da of the rotating shaft 3. The stator case 9 includes a bottom wall 92 (e.g., first end portion) provided at one end portion of the circumferential wall 91 in the axial direction Da. An opening is formed in a center of the bottom wall 92, and a bearing 31 that supports the rotating shaft 3 is fixed to the opening. The stator case 9 includes an end portion 98 (e.g., second end portion) on a side opposite to the bottom wall 92 and this end portion is open. A flange portion 93 is formed on an outer circumference of the open end portion 98. In the following description, an outer circumferential surface Sb of the stator case 9 indicates an outer circumferential surface 91a of the circumferential wall 91 and an outer circumferential surface 92a of the bottom wall 92.

The rotary machine 1 includes an impeller housing 70 that houses the compressor impeller 4 and a motor housing 8 that houses the electric motor 2. The motor housing 8 is connected to the compressor impeller 4 in the axial direction Da of the rotating shaft 3. In addition, the rotary machine 1 includes an inner lid portion 71 that closes an open end portion 98 of the stator case 9, and an outer lid portion 72 that closes an open portion of the motor housing 8. A central hole through which the rotating shaft 3 is inserted is formed in the inner lid portion 71 (e.g., lid). A cylindrical sleeve 73 is provided between the inner lid portion 71 and the outer lid portion 72. A bearing 32 that rotatably supports the rotating shaft 3 is fixed inside the sleeve 73.

The motor housing 8 includes a motor accommodating portion 81 (e.g., outer portion) that is externally mounted on the stator case 9 and substantially houses the electric motor 2 therein, and an inverter accommodating portion 82 in which the inverter 6 is installed. The inverter 6 that controls driving of the electric motor 2 is installed in the inverter accommodating portion 82. A cover portion 61 that covers the inverter 6 is fixed to the inverter accommodating portion 82.

An inner circumferential surface Sa of the motor accommodating portion 81 substantially abuts the outer circumferential surface Sb of the stator case 9, and a cooling channel F is formed between the inner circumferential surface Sa of the motor accommodating portion 81 and the outer circumferential surface Sb of the stator case 9. A refrigerant C (see FIG. 4) such as a coolant for cooling the electric motor 2 passes through the cooling channel F. A structure for forming the cooling channel F will be described below.

The motor accommodating portion 81 includes a side wall 83 surrounding the circumferential wall 91 of the stator case 9. A back wall 84 (see FIG. 3) is provided at one end portion of the side wall 83 in the axial direction Da, and the other end portion on a side opposite thereto (hereinafter referred to as an "open end 85") is open. The bearing 31 that rotatably supports the rotating shaft 3 is fixed to the back wall 84. The side wall 83 includes an inner circumferential surface 83a facing the outer circumferential surface 91a of the circumferential wall 91 of the stator case 9. A stepped portion 83b having an inner diameter that increases on the way from one end portion to the other end portion is formed on the inner circumferential surface 83a. The flange portion 93 of the stator case 9 abuts the stepped portion 83b. Also, in the following description, the inner circumferential surface Sa of the motor accommodating portion 81 indicates the inner circumferential surface 83*a* of the side wall 83 and an inner circumferential surface 84*a* of the back wall 84.

The stator case 9 is inserted into the side wall 83 from the open end 85 of the side wall 83 (see FIG. 2). The stator case 9 includes the flange portion 93, and a seal member 94 is attached to an outer circumferential end 93*a* of the flange portion 93. The flange portion 93 moves in the axial direction Da. The seal member 94 follows movement of the flange portion 93 and moves while being in sliding contact with the inner circumferential surface 83*a* of the side wall 83. The flange portion 93 moves until it abuts the stepped portion 83*b*. The flange portion 93 abuts the stepped portion 83*b*, and thus the seal member 94 ensures sealing performance (airtightness or liquid-tightness) of the cooling channel F. The seal member 94 moves while being in sliding contact with the inner circumferential surface 83*a* of the side wall 83. Accordingly, even if the flange portion 93 is slightly displaced in the axial direction Da, the substantial sealing performance of the cooling channel F can be ensured.

Figure 3:
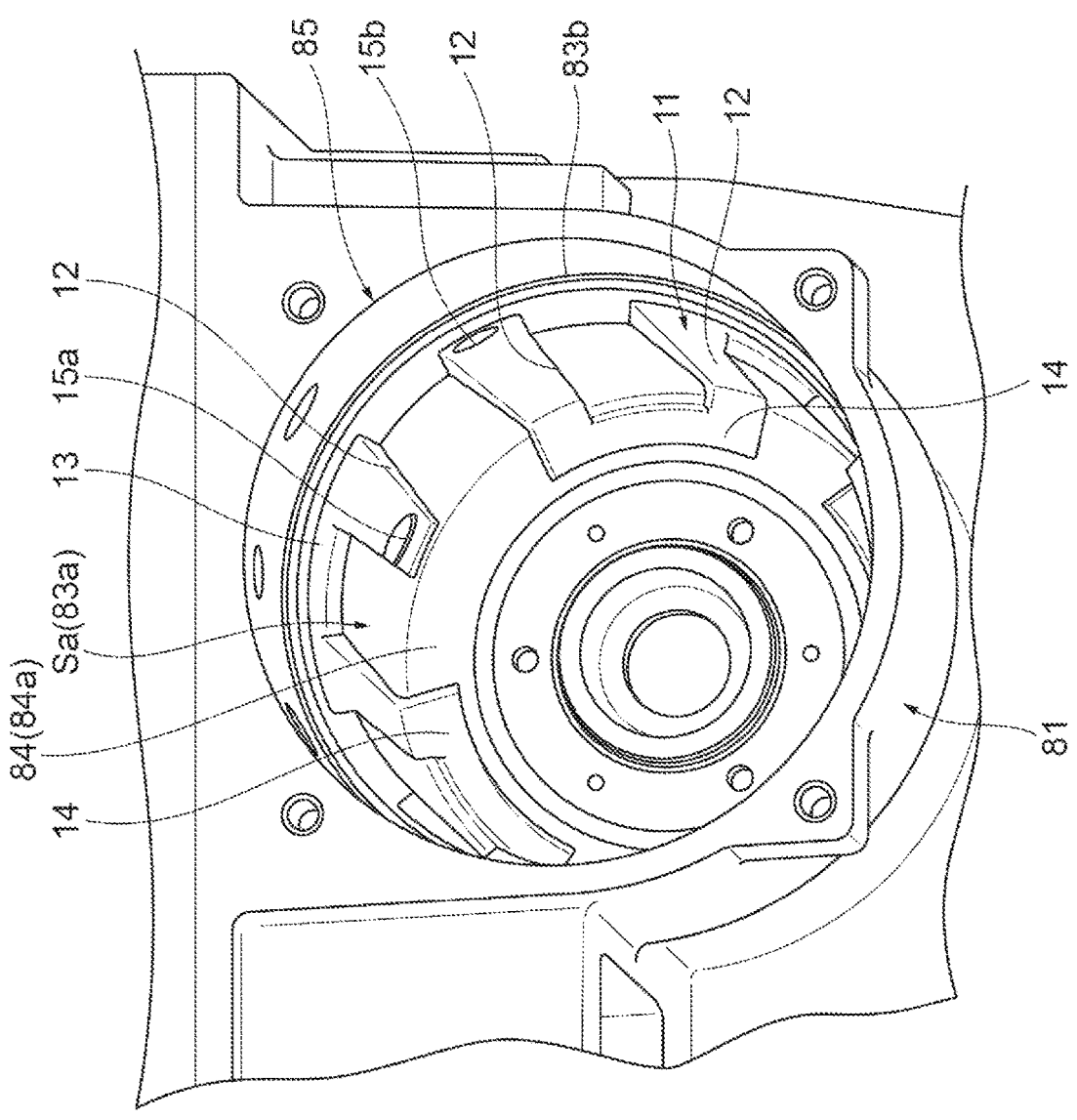
FIG. 3 is a perspective view illustrating an inner circumferential surface of a motor housing.
Figure 4:
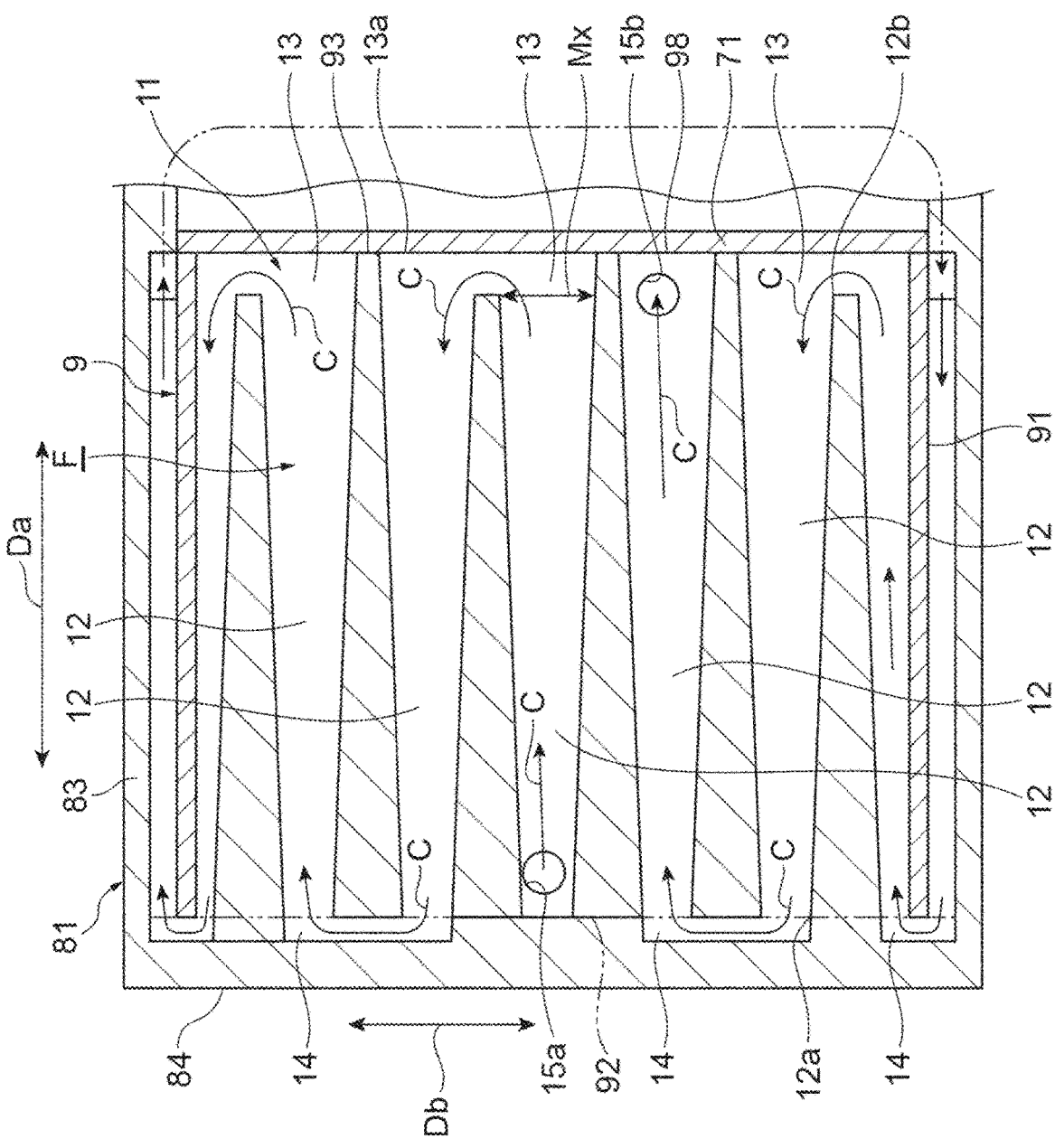
FIG. 4 is an explanatory diagram schematically illustrating a flow of a refrigerant flowing through a cooling channel with an outline of the cooling channel developed in a plan view.

As illustrated in FIGS. 2, 3, and 4, the flow path groove 11 (e.g., flow path) through which the refrigerant C passes is formed on the inner circumferential surface 83*a* of the side wall 83. The flow path groove 11 includes a plurality of main grooves 12 (e.g., first grove) provided on the inner circumferential surface 83*a* of the side wall 83, and a connection groove 13 (e.g., second grove) that causes the plurality of main grooves 12 to fluidly coupled with each other. In a case in which the connection groove 13 is understood as the cooling channel F, it is open at the stepped portion 83*b* of the side wall 83, and thus the connection groove 13 is sealed by the stepped portion 83*b* abutting the flange portion 93 of the stator case 9, so that it is configured to be able to function as the cooling channel F.

The main grooves 12 are elongated grooves extending in the axial direction Da of the rotating shaft 3. The plurality of main grooves 12 are arranged side by side at uniformly spaced intervals in a circumferential direction Db of the stator case 9, that is, in a rotating direction of the rotating shaft 3. Also, each of the main grooves 12 can be provided in a tapered shape such that its width is widened toward a direction away from the back wall 84. As described above, the connection groove 13 is open at the stepped portion 83*b* of the side wall 83, and in a case in which the motor housing 8 (motor accommodating portion 81) is molded by die casting, the connection groove 13 is unlikely to be undercut. Further, by forming the main grooves 12 in tapered shapes, the flow path groove 11 as a whole is less likely to be undercut. As a result, a burden associated with finishing such as machining is reduced, and workability during manufacturing is improved, which enables efficient manufacturing. The undercut is an uneven portion of a mold or a molded article, and means a portion which becomes an obstacle when the molded article is taken out from the mold.

The inner circumferential surface 84*a* of the back wall 84 faces the bottom wall 92 (e.g., one end portion) of the stator case 9. A return groove 14 (e.g., back groove) is formed in the inner circumferential surface 84*a* of the back wall 84. The return groove 14 communicates with the flow path groove 11 and becomes a part of the cooling channel F. The return groove 14 fluidly couples with end portions of the plurality of main grooves 12 on the back wall 84 side to each other, so that the refrigerant C can communicate therewith. On the other hand, the connection groove 13 is provided on a side opposite to the back wall 84. The connection groove 13 fluidly couples with end portions of the plurality of main grooves 12 to each other, so that the refrigerant C can communicate therewith. That is, one end portions 12*a* of the plurality of main grooves 12 are fluidly couple with the return groove 14, and as a result, the plurality of adjacent main grooves 12 communicate with each other. Also, the other end portions 12*b* of the plurality of main grooves 12 are fluidly coupled with the connection groove 13, and as a result, the plurality of adjacent main grooves 12 communicate with each other.

The one end portion 12*b* of the main groove 12 is connected to the connection groove 13. The connection groove 13 includes open portion 13*a*. The open portion 13*a* is closed with the inner lid portion 71. The other end portion 12*a* of the main groove 12 is located opposite to the connection groove 13 and the inner lid portion 71. The other end portion is connected to the return groove 14. The motor accommodating portion 81 includes an inlet 15*a* and an outlet 15*b* for the refrigerant C. The inlet 15*a* and the outlet 15*b* fluidly couple with the main groove 12. The inlet 15*a* is located adjacent to the end portion 12*a* of the main groove 12 and the outlet 15*b* is located adjacent to the end portion 12*b* opposite to the end portion 12*a*. The main groove 12 includes a cross-section decreasing from the end portion 12*b* connected to the second groove 13 to the end portion 12*a* opposite to the second groove 13.

When the stator case 9 is mounted inside the motor accommodating portion 81, the flow path groove 11 and the return groove 14 are closed by the outer circumferential surface Sb of the stator case 9, thereby forming the cooling channel F through which the refrigerant C passes. The cooling channel F forms a one-pass channel. A one-pass channel is a flow path that connects certain two locations to each other and is connected as one without branching. The connection groove 13 and the return groove 14 are provided alternately in the circumferential direction Db. The refrigerant C that has passed through the connection groove 13 flows in one direction along the main grooves 12 (a forward flow). After that, the flow of the refrigerant C is reversed by passing through the return groove 14, and this time, it flows in the opposite direction along the adjacent main groove 12 (a return flow). As a result, the one-pass channel is formed in which the forward flow and the return flow are generated alternately. An inlet 15*a* for receiving the refrigerant C is provided at an upstream end portion of the one-pass channel. An outlet 15*b* for discharging the refrigerant C is provided at a downstream end portion of the one-pass channel. By forming the one-pass channel, the number of stay points of the refrigerant C can be reduced, and a smooth flow of the refrigerant C can be easily formed.

In the flow path groove 11, a flow path cross-section of the main groove 12 near the connection groove 13 is the largest, which is the maximum flow path cross-section. On the other hand, a flow path cross-section of the return groove 14 is smaller than the maximum flow path cross-section. By making the flow path cross-section of the return groove 14 smaller than the maximum flow path cross-section of the flow path groove 11, and thus a flow velocity in the return groove 14 becomes relatively faster than that in the flow path groove 11, and the back wall 84 can be cooled.

In addition, the back wall 84 on which the return groove 14 is formed is provided between the compressor impeller 4 (see FIG. 1) and the stator 22. Further, at least a portion of the return groove 14 is disposed to overlap the compressor impeller 4 in the axial direction Da. As a result, both the stator 22 and the compressor impeller 4 can be cooled by the refrigerant C passing through the return groove 14. Also, "at least a portion of the return groove 14 is disposed to overlap the compressor impeller 4 in the axial direction Da" indicates that at least a portion of the return groove 14 is disposed to overlap the compressor impeller 4 when the back wall 84 is viewed in the axial direction Da.

The outer circumferential surface 91*a* of the circumferential wall 91 is a part of the outer circumferential surface Sb of the stator case 9. The outer circumferential surface 91*a* is in contact with the inner circumferential surface 83*a* of the side wall 83 of the motor accommodating portion 81. The outer circumferential surface 91*a* is basically a cylindrical flat surface without irregularities, and at least a region thereof facing the flow path groove 11 forms a continuously smooth cylindrical surface without any groove which the refrigerant C passes. As a result, when the flow path groove 11 serving as the cooling channel F is closed, it can be sealed (airtightly or liquid-tightly).

Next, operations and effects of the rotary machine 1 will be described. The rotary machine 1 includes the stator case 9 and the motor accommodating portion 81 that is externally mounted on the stator case 9. The flow path groove 11 through which the refrigerant C passes is formed on the inner circumferential surface Sa of the motor accommodating portion 81, and the flow path groove 11 is disposed around the stator case 9. The stator 22 of the electric motor 2 is cooled via the stator case 9 by the refrigerant C passing through the flow path groove 11. As a result, the electric motor 2 can be cooled. In addition, the cooling channel F (the flow path groove 11 through which the refrigerant C passes) is provided between the stator case 9 and the motor accommodating portion 81. Accordingly, it may to obtain the cooling channel F with a stable shape, and it may guide the refrigerant C with a high flow velocity to a narrower range, so that the cooling performance can be easily improved.

In the rotary machine 1, since the flow path groove 11 serving as the cooling channel F is formed in the motor accommodating portion 81, the stator case 9 can be formed using a wider range of molding methods. For example, the stator case 9 can be formed by steel deep drawing, and as a result, a manufacturing cost of the stator case 9 as a single item can be reduced. Further, by using a steel for a material of the stator case 9, fitting of dissimilar metals is eliminated, and thus reliability in terms of quality is improved. Moreover, the stator case 9 can also be manufactured by pressing, cutting, or the like from a pipe material.

Also, the flow path groove 11 is mainly formed in the motor accommodating portion 81. That is, with respect to the stator case 9, there are less restrictions on dimensions, a structure, and the like for forming the flow path groove 11. As a result, for example, it may devise a technique such as thinning a thickness of the stator case 9 to uniformly cool the stator 22 over a wide range, and the electric motor 2 can be cooled. In addition, in the rotary machine 1, the outer circumferential surface Sb of the stator case 9 is flat and has a form with sealing properties. However, if it is permissible in view of restrictions on a strength and a structure of the stator case 9, a groove serving as a part of the cooling channel F may be provided in the outer circumferential surface Sb of the stator case 9 as an auxiliary.

Further, the motor accommodating portion 81 has the back wall 84, and the return groove 14 communicating with the flow path groove 11 is formed in the back wall 84. By forming the return groove 14 on the back wall 84, the inner side end portion (one end portion) of the stator 22 fixed to the stator case 9 can be cooled. In addition, the return groove 14 is provided not on the side wall 83 of the motor accommodating portion 81 but on the back wall 84, and thus in a case in which the motor accommodating portion 81 is formed by die casting, the return groove 14 is less likely to be undercut, which can improve formability.

Also, the flow path groove 11 is provided with the plurality of main grooves 12. The plurality of main grooves 12 are arranged side by side in the circumferential direction Db of the stator case 9 and communicate with each other through the return groove 14. As a result, the stator 22 can be cooled from a wide range of the stator case 9 in the circumferential direction Db. The plurality of main grooves 12 are arranged side by side at uniformly spaced intervals, which can achieve uniformly cooling the stator 22. The phrase "arranged side by side at uniformly spaced intervals" indicates that they are arranged at substantially equal intervals while allowing a slight error.

Since the plurality of main grooves 12 communicate with each other via the connection groove 13, a common refrigerant C can be used to cool a wide range. The connection groove 13 via which the plurality of main grooves 12 communicate with each other is open at the stepped portion 83*b*, and thus in a case in which the motor accommodating portion 81 is formed by die casting, the main grooves 12 and the connection groove 13 are less likely to be undercut, which can improve formability.

Figure 5:
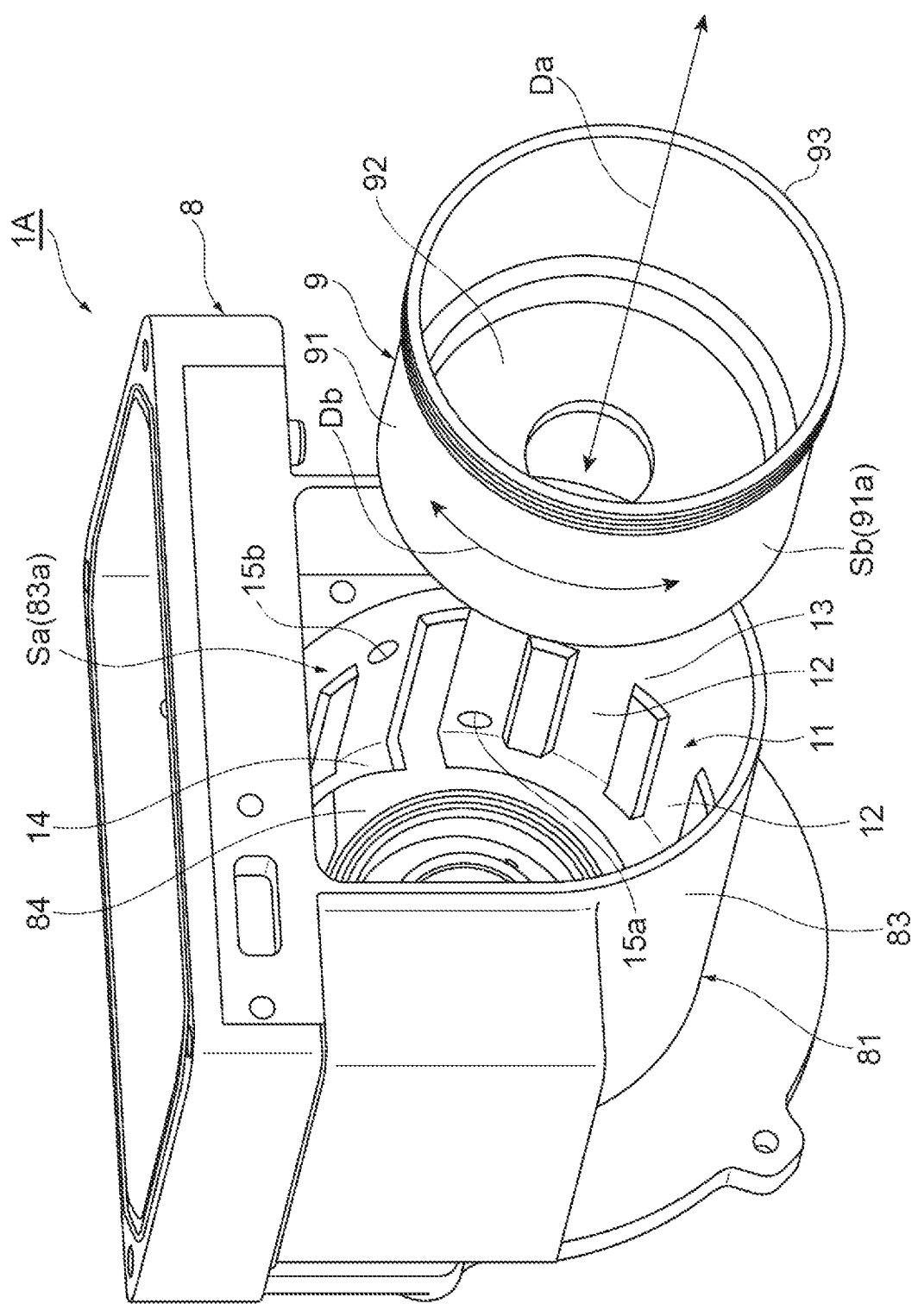
FIG. 5 is an exploded perspective view illustrating a part of an example rotary machine.
Figure 6:
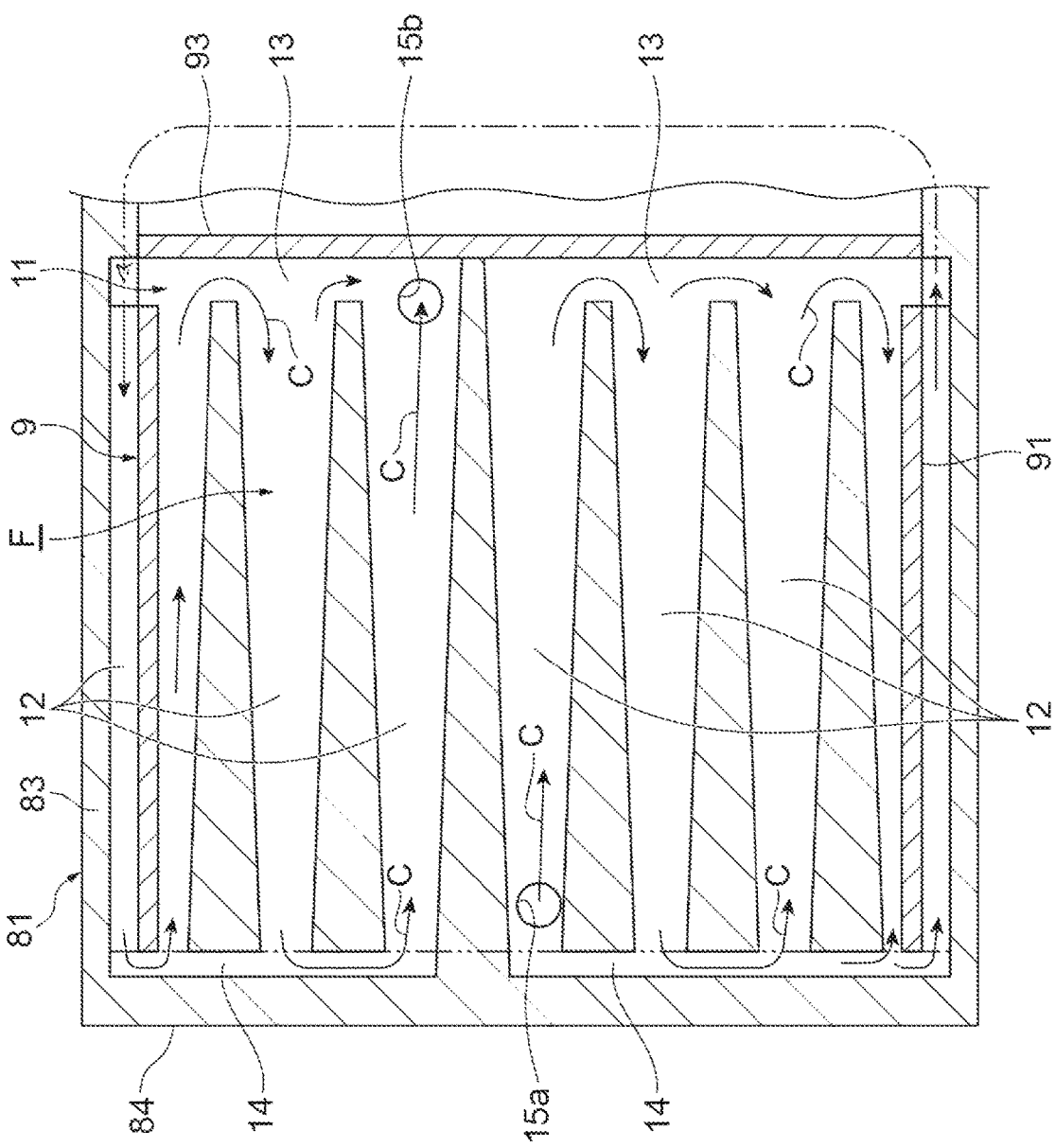
FIG. 6 is an explanatory diagram schematically illustrating a flow of a refrigerant flowing through a cooling channel with an outline of the cooling channel of an example rotary machine developed in a plan view.

An example rotary machine 1A will be described with reference to FIGS. 5 and 6. Also, the rotary machine 1A has the same structure and configuration as the rotary machine 1 described above. Basically, the same operations and effects as those of the rotary machine 1 are achieved. Accordingly, in the following description, the description will focus on different points, the same structures and configurations will be denoted by the same reference numerals, and detailed description thereof will be omitted.

The rotary machine 1A includes the stator case 9 that surrounds the stator 22 (see FIG. 1) and to which the stator 22 is fixed, and the motor accommodating portion 81 externally mounted on the stator case 9. The inner circumferential surface Sa of the motor accommodating portion 81 faces the outer circumferential surface Sb of the stator case 9. The motor accommodating portion 81 includes the side wall 83, and the inner circumferential surface 83*a* of the side wall 83 faces the outer circumferential surface 91*a* of the circumferential wall 91 of the stator case 9. The flow path groove 11 through which the refrigerant C passes is formed on the inner circumferential surface 83*a* of the side wall 83.

The flow path groove 11 includes the plurality of main grooves 12 and the connection groove 13. The main grooves 12 are vertically elongated grooves that are long in the axial direction Da of the rotating shaft 3. The plurality of main grooves 12 are arranged side by side at uniformly spaced intervals in the circumferential direction Db of the stator case 9. The inlet 15*a* for the refrigerant C is formed in one main groove 12 among the plurality of main grooves 12, and the outlet 15*b* for the refrigerant C is formed in the main groove 12 adjacent to the main groove 12 in which the inlet 15*a* is formed. The connection groove 13 basically connects the plurality of main grooves 12 to be able to communicate with each other over the entire circumference in the circumferential direction Db, except for a region that partitions the main groove 12 of the inlet 15*a* and the main groove 12 of the outlet 15*b*.

The motor accommodating portion 81 has the back wall 84 facing the bottom wall 92 of the stator case 9. The back wall 84 is provided with the return groove 14. The return groove 14 basically connects the plurality of main grooves 12 to be able to communicate with each other over the entire circumference in the circumferential direction Db, except for a region that partitions the main groove 12 of the inlet 15*a* and the main groove 12 of the outlet 15*b*.

In the rotary machine 1A, as in the rotary machine 1 described above, the flow path groove 11 through which the refrigerant C passes is formed on the inner circumferential surface Sa of the motor accommodating portion 81. The flow path groove 11 is disposed around the stator case 9. The stator 22 of the electric motor 2 is cooled via the stator case 9 by the refrigerant C passing through the flow path groove 11. As a result, the electric motor 2 can be cooled. Further, the flow path groove 11 is mainly formed in the motor accommodating portion 81. That is, with respect to the stator case 9 inside the motor accommodating portion 81, there are few restrictions on dimensions, structures, and the like for forming the flow path groove 11. Accordingly, it may improve the cooling performance for cooling the electric motor 2. In addition, the connection groove 13 and the return groove 14 are formed to connect the plurality of main grooves 12 to each other over the entirety and do not form a one-pass flow path.

It is to be understood that not all aspects, advantages and features described herein may necessarily be achieved by, or included in, any one particular example. Indeed, having described and illustrated various examples herein, it should be apparent that other examples may be modified in arrangement and detail. For example, an electric supercharger has been described as one type of the rotary machine, but it is widely applicable to rotary machines including impellers rotated by driving electric motors, and for example, it may be applied to an electrically assisted supercharger, and the like.

In addition, various shapes can be adopted for a flow path groove that forms a cooling channel, and for example, they may be, for example, a shape in a circumferential direction of a stator case, a wavy shape, and the like.

What is claimed is:

1. A rotary machine comprising:
an electric motor including a rotor and a stator;
a rotating shaft to be rotated by driving the electric motor;
an impeller attached to the rotating shaft;
an inner case surrounding the stator and to which the stator is fixed, the inner case including a bottom wall located between the impeller and the stator, a flange portion having a circumferential end that extends outwardly from the inner case in a radial direction of the rotating shaft, and an inner open end surrounded by the flange portion;
an outer housing externally mounted on the inner case, wherein the outer housing includes:
an inner circumferential surface comprising a first surface facing an outer circumferential surface of the inner case, and a second surface extending from the first surface beyond the inner case in an axial direction of the rotating shaft, the second surface partially facing the flange portion;
a back wall facing the bottom wall of the inner case in the axial direction of the rotating shaft, and located between the impeller and the bottom wall of the inner case;
a stepped portion extending away from the first surface in the radial direction and located between the first surface and the second surface; and
a flow path groove formed on the first surface of the outer housing to transmit a refrigerant, the flow path groove including an opening formed at the stepped portion, wherein the flange portion of the inner case abuts the stepped portion in the axial direction to block the opening;
a seal located between and in contact with both the circumferential end of the flange portion and the second surface of the outer housing in the radial direction to prevent leakage of the refrigerant from the opening; and
an inner lid that covers the inner open end of the inner case, the inner lid contacting the second surface of the outer housing in the radial direction,
wherein the outer housing includes a back groove formed on the back wall, facing the bottom wall, and communicating with the flow path groove, wherein the flow path groove extends from the back groove in the axial direction, and
wherein the flow path groove includes a plurality of main grooves arranged side by side in a circumferential direction of the inner case and extending from the back groove in the axial direction, the plurality of main grooves communicating with each other via the back groove.

2. The rotary machine according to claim 1, wherein one or more of the plurality of main grooves has a width that increases as it extends away from the back groove.

3. The rotary machine according to claim 1, wherein the flow path groove includes a connection groove that fluidly couples the plurality of main grooves to each other and forms the opening, and wherein the flange portion abuts the stepped portion to block the opening of the connection groove.

4. The rotary machine according to claim 1, wherein the flow path groove includes a connection groove that fluidly couples the plurality of main grooves to each other, and wherein a first end portion of the main groove is connected to the back groove, and a second end portion of the main groove is connected to the connection groove.

5. The rotary machine according to claim 4, wherein a plurality of the connection grooves and a plurality of the return grooves are alternately spaced apart from each other around the circumferential direction.

6. The rotary machine according to claim 1, wherein the inner case includes the outer circumferential surface that comes into contact with the inner circumferential surface of the outer housing, and wherein the outer circumferential surface facing the flow path groove of the inner case forms a continuously smooth cylindrical surface without any groove which the refrigerant passes.

7. The rotary machine according to claim 1, further comprising:
the inner lid that faces the stator in the axial direction of the rotating shaft; and
an outer lid that covers an outer open end of the outer housing and is spaced apart and separated from the inner lid in the axial direction,
wherein the inner lid is located inside the outer housing between the outer lid and the stator in the axial direction.

8. The rotary machine according to claim 7, further comprising:
a sleeve located between and contacting both the inner lid and the outer lid; and
a bearing located in the sleeve and rotatably supporting the rotating shaft.

9. The rotary machine according to claim 8, wherein the outer lid is partially inserted into the sleeve.

10. The rotary machine according to claim 1, further comprising an outer lid spaced apart and separated from the inner lid in the axial direction, the inner lid located inside the outer housing, wherein the outer housing includes an outer open end opposite the back wall in the axial direction, the outer open end covered with the outer lid.

11. The rotary machine according to claim 1, further comprising:

a sleeve located in the outer housing and contacting the inner lid; and a bearing located in the sleeve and rotatably supporting the rotating shaft.

12. The rotary machine according to claim 1, wherein the outer housing further comprises:

a side wall connected to the back wall, the side wall including the inner circumferential surface; and a back groove formed on the back wall, the back groove fluidly coupled with the flow path groove, wherein the flow path groove extends from the back groove in the axial direction, and wherein a width of the flow path groove increases as it extends away from the back groove.

13. A rotary machine comprising:

an electric motor including a rotor and a stator;

a rotating shaft to be rotated by driving the electric motor;

an impeller attached to the rotating shaft;

an inner case surrounding the stator and to which the stator is fixed, and the inner case including a bottom wall located between the impeller and the stator, a flange portion having a circumferential end that extends outwardly from the inner case in a radial direction of the rotating shaft, and an inner open end surrounded by the flange portion;

an outer housing externally mounted on the inner case, wherein the outer housing includes:

an inner circumferential surface comprising a first surface facing an outer circumferential surface of the inner case, and a second surface extending from the first surface beyond the inner case in an axial direction of the rotating shaft, the second surface partially facing the flange portion;

a back wall facing the bottom wall of the inner case in the axial direction of the rotating shaft, and located between the impeller and the bottom wall of the inner case;

a stepped portion extending away from the first surface in the radial direction and located between the first surface and the second surface; and a flow path groove formed on the first surface of the outer housing to transmit a refrigerant, the flow path groove including an opening formed at the stepped portion, wherein the flange portion of the inner case abuts the stepped portion in the axial direction to block the opening;

a seal located between and in contact with both the circumferential end of the flange portion and the second surface of the outer housing in the radial direction to prevent leakage of the refrigerant from the opening; and an inner lid that covers the inner open end of the inner case, the inner lid contacting the second surface of the outer housing in the radial direction, wherein the outer housing includes a back groove formed on the back wall, facing the bottom wall, and communicating with the flow path groove, wherein the flow path groove extends from the back groove in the axial direction, wherein the flow path groove includes an inlet configured to receive the refrigerant and an outlet configured to discharge the refrigerant, wherein the flow path groove and the back groove form a one-pass channel connecting the inlet to the outlet, wherein the inlet is located closer to the bottom wall than to the flange portion, and wherein the outlet is located closer to the flange portion than to the bottom wall.

14. The rotary machine according to claim 13, further comprising the inner lid that faces the stator in the axial direction of the rotating shaft, the inner lid located inside the outer housing; and an outer lid that covers an outer open end of the outer housing and is spaced apart and separated from the inner lid in the axial direction, wherein the inner lid is located between the outer lid and the stator.

\* \* \* \* \*